(12) United States Patent
Tsou et al.

(10) Patent No.: US 11,496,061 B2
(45) Date of Patent: Nov. 8, 2022

(54) ASYMMETRIC POWER CONVERTER AND OPERATIONAL METHOD THEREOF

(71) Applicant: Leadtrend Technology Corp., Hsinchu County (TW)

(72) Inventors: Ming-Chang Tsou, Hsinchu County (TW); Yao-Tsung Chen, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 143 days.

(21) Appl. No.: 17/100,968

(22) Filed: Nov. 23, 2020

(65) Prior Publication Data
US 2021/0359614 A1 Nov. 18, 2021

Related U.S. Application Data

(60) Provisional application No. 62/963,181, filed on Jan. 20, 2020.

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0058* (2021.05); *H02M 1/08* (2013.01)

(58) Field of Classification Search
CPC .. H02M 3/33592; H02M 1/0058; H02M 1/08; H02M 3/01; H02M 3/33561; H02M 3/33571
See application file for complete search history.

(56) References Cited

U.S. PATENT DOCUMENTS

| | | | | |
|---|---|---|---|---|
| 2002/0186026 A1* | 12/2002 | Elferich | ............ | H02M 3/33561 324/652 |
| 2004/0170030 A1* | 9/2004 | Duerbaum | ........ | H02M 3/33561 363/16 |
| 2005/0068792 A1* | 3/2005 | Yasumura | ......... | H02M 3/33592 363/21.06 |
| 2009/0256423 A1* | 10/2009 | Kyono | .............. | H02M 3/33561 307/31 |
| 2010/0046251 A1* | 2/2010 | Kyono | .............. | H02M 3/33561 363/21.02 |

FOREIGN PATENT DOCUMENTS

| | | |
|---|---|---|
| CN | 1578077 A | 2/2005 |
| CN | 102792576 A | 11/2012 |
| WO | 2007/040227 A1 | 4/2007 |

* cited by examiner

*Primary Examiner* — Kyle J Moody
(74) *Attorney, Agent, or Firm* — Winston Hsu

(57) ABSTRACT

Asymmetric power converter includes an upper bridge switch, a lower bridge switch, a primary winding, a first secondary winding, a second secondary winding, a control circuit. The first secondary winding and the second secondary winding output a first output voltage and a second output voltage of a secondary side of the asymmetric power converter respectively, and voltage polarity of the first secondary winding is different from voltage polarity of the second secondary winding. The control circuit controls the lower bridge switch and the upper bridge switch according to the first output voltage and the second output voltage, respectively.

20 Claims, 3 Drawing Sheets

ASYMMETRIC POWER CONVERTER AND OPERATIONAL METHOD THEREOF

CROSS REFERENCE TO RELATED APPLICATIONS

This application claims the benefit of U.S. Provisional Application No. 62/963,181, filed on Jan. 20, 2020 and entitled "Control method used in asymmetric half bridge LLC topology", the contents of which are incorporated herein by reference.

BACKGROUND OF THE INVENTION

1. Field of the Invention

The present invention relates to an asymmetric power converter and an operational method thereof, and particularly to an asymmetric power converter and an operational method thereof that use dual-feedback control to make a ratio of a second output voltage of the asymmetric power converter to a first output voltage of the asymmetric power converter be any real number greater than one.

2. Description of the Prior Art

In the prior art, asymmetric inductor-inductor-capacitor (LLC) power converter is a resonant circuit that can make dual output voltages of a secondary side of the inductor-inductor-capacitor power converter constant through controlling frequencies of two power switch of a primary side of the inductor-inductor-capacitor power converter (regulating frequency) wherein the inductor-inductor-capacitor power converter utilizes zero voltage turning-on corresponding to the two power switches and zero voltage turning-off corresponding to a rectifier diode of the secondary side to control the frequencies of the two power switches.

Because the two power switches are symmetrically conducted, a ratio of the dual output voltages cannot be changed, and each of the dual output voltages needs two secondary windings, resulting in the dual output voltages needing four secondary windings. In addition, because the ratio of the dual output voltages cannot be changed, an additional direct current/direct current control driving module needs to be added for a backlight drive application requiring a larger output voltage range. Therefore, how to improve the above-mentioned shortcomings of the inductor-inductor-capacitor power converter becomes an important issue of a designer of the inductor-inductor-capacitor power converter.

SUMMARY OF THE INVENTION

An embodiment of the present invention provides an asymmetric power converter, wherein the asymmetric power converter comprises an upper bridge switch, a lower bridge switch, a primary winding, a first secondary winding, a second secondary winding, and a control circuit. The upper bridge switch and the lower bridge switch are coupled to the primary winding, and the upper bridge switch, the lower bridge switch, and the primary winding are installed in a primary side of the asymmetric power converter. The first secondary winding and the second secondary winding are used for outputting a first output voltage and a second output voltage of a secondary side of the asymmetric power converter respectively, wherein the first secondary winding and the second secondary winding are installed in the secondary side of the asymmetric power converter, and voltage polarity of the first secondary winding is different from voltage polarity of the second secondary winding. The control circuit is used for controlling the lower bridge switch and the upper bridge switch according to the first output voltage and the second output voltage, respectively.

Another embodiment of the present invention provides an operational method of an asymmetric power converter, wherein the asymmetric power converter comprises an upper bridge switch, a lower bridge switch, a primary winding, a first secondary winding, a second secondary winding, and a control circuit. The operational method comprises the control circuit controlling a turning-on time of the lower bridge switch according to a first output voltage; during the turning-on time of the lower bridge switch, the inductor-capacitor resonant tank discharging and transferring energy to the second secondary winding through the primary winding to generate a second output voltage; the control circuit controlling a turning-on time of the upper bridge switch according to the second output voltage; and during the turning-on time of the upper bridge switch, a direct current (DC) voltage transferring energy to the first secondary winding through the primary winding to generate the first output voltage. Voltage polarity of the first secondary winding is different from voltage polarity of the second secondary winding.

The present invention provides an asymmetric power converter and an operational method thereof. The asymmetric power converter and the operational method thereof utilize a dual-feedback control of a control circuit controlling a turning-on time of a lower bridge switch according to a first output voltage and controlling a turning-on time of an upper bridge switch according to a second output voltage to make the asymmetric power converter only need three windings (a primary winding, a first secondary winding and a second secondary winding), a ratio of the second output voltage to the first output voltage be any real number greater than one, and the turning-on time of the upper bridge switch be not equal to the turning-on time of the lower bridge switch. Therefore, compared to the prior art, because the ratio of the second output voltage to the first output voltage can be any real number greater than one, the asymmetric power converter is very suitable for a backlight drive application such as a television requiring a larger output voltage range, and because the asymmetric power converter only needs the three windings, cost of the asymmetric power converter is lower.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating operation of an inductor-capacitor resonant tank, a primary winding, a first secondary winding, and a second secondary winding when an upper bridge switch is turned on.

FIG. 3 is a diagram illustrating operation of the inductor-capacitor resonant tank, the primary winding, the first secondary winding, and the second secondary winding when a lower bridge switch is turned on.

DETAILED DESCRIPTION

Figure 1:
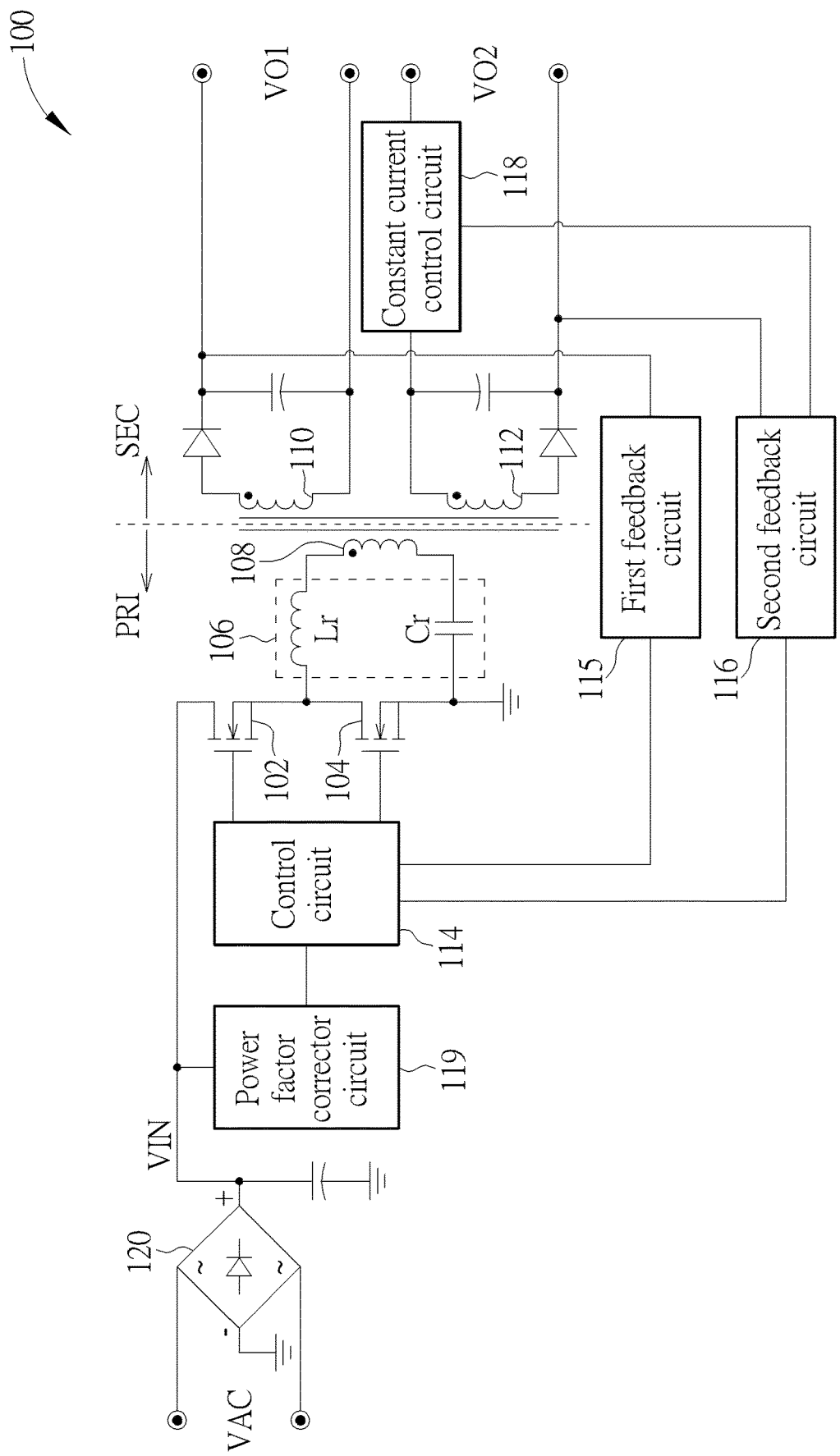
FIG. 1 is a diagram illustrating an asymmetric power converter according to a first embodiment of the present invention.

Please refer to FIG. 1. FIG. 1 is a diagram illustrating an asymmetric power converter 100 according to a first embodiment of the present invention, wherein the asymmetric power converter 100 includes an upper bridge switch 102, a lower bridge switch 104, an inductor-capacitor resonant tank (LC resonant tank) 106, a primary winding 108, a first secondary winding 110, a second secondary winding 112, a control circuit 114, a first isolation component 115, a second isolation component 116, and a constant current control circuit 118, and the asymmetric power converter 100 is an inductor-inductor-capacitor power converter (LLC power converter). As shown in FIG. 1, the upper bridge switch 102 and the lower bridge switch 104 are coupled to the primary winding 108 through the inductor-capacitor resonant tank 106, and the upper bridge switch 102, the lower bridge switch 104, the inductor-capacitor resonant tank 106, and the primary winding 108 are installed in a primary side PRI of the asymmetric power converter 100, and the first secondary winding 110 and the second secondary winding 112 are installed in a secondary side SEC of the asymmetric power converter 100. In addition, as shown in FIG. 1, the first secondary winding 110 is used for outputting a first output voltage VO1 of the secondary side SEC of the asymmetric power converter 100, the second secondary winding 112 is used for outputting a second output voltage VO2 of the secondary side SEC of the asymmetric power converter 100, and the control circuit 114 controls a turning-on time TON2 of the lower bridge switch 104 according to the first output voltage VO1 and controls a turning-on time TON1 of the upper bridge switch 102 according to the second output voltage VO2, wherein the second output voltage VO2 is greater than the first output voltage VO1, and when the second output voltage VO2 is applied to a backlight drive application of light-emitting diodes of a television, the control circuit 114 further combines the constant current control circuit 118 to control the turning-on time TON1 of the upper bridge switch 102. In addition, the control circuit 114 is installed in the primary side PRI of the asymmetric power converter 100, both the first isolation component 115 and the second isolation component 116 are used for isolating the primary side PRI of the asymmetric power converter 100 from the secondary side SEC of the asymmetric power converter 100, and the first isolation component 115 and the second isolation component 116 are photo couplers. However, the present invention is not limited to the first isolation component 115 and the second isolation component 116 being photo couplers, that is, the first isolation component 115 and the second isolation 116 can be other component for isolating the primary side PRI of the asymmetric power converter 100 from the secondary side SEC of the asymmetric power converter 100. In addition, a ground of the primary side PRI of the asymmetric power converter 100 and a ground of the secondary side SEC of the asymmetric power converter 100 can be the same or different. In addition, the asymmetric power converter 100 further comprises a power factor corrector circuit 119 coupled between the control circuit 114 and a bridge rectifier 120, wherein the power factor corrector circuit 119 is used for improving a power factor of the asymmetric power converter 100 to make the power factor of the asymmetric power converter 100 close to one and suppressing a harmonic wave of a first output current IO1 and a second output current IO2 of the asymmetric power converter 100.

Figure 2:
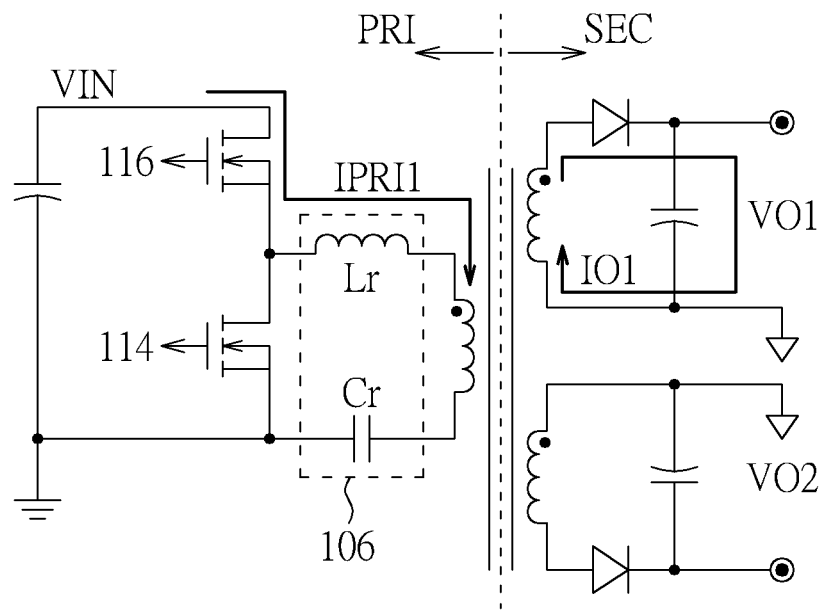
Figure 3:
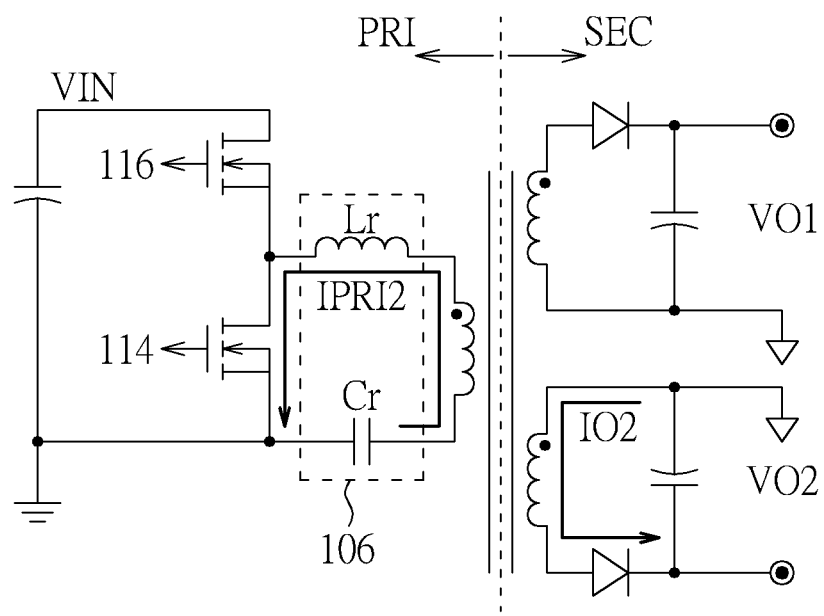

Please refer to FIGS. 2, 3. FIG. 2 is a diagram illustrating operation of the inductor-capacitor resonant tank 106, the primary winding 108, the first secondary winding 110, and the second secondary winding 112 when the upper bridge switch 102 is turned on, and FIG. 3 is a diagram illustrating operation of the inductor-capacitor resonant tank 106, the primary winding 108, the first secondary winding 110, and the second secondary winding 112 when the lower bridge switch 104 is turned on. As shown in FIG. 2, when the upper bridge switch 102 is turned on (the lower bridge switch 104 is turned off), a primary side current IPRI1 flows through the upper bridge switch 102, an inductor Lr of the inductor-capacitor resonant tank 106, and the primary winding 108 to charge a capacitor Cr of the inductor-capacitor resonant tank 106. At this time, because voltage polarity of the first secondary winding 110 is different from voltage polarity of the secondary winding 112, only the first output current IO1 flows through the first secondary winding 110, wherein it can be known that the voltage polarity of the first secondary winding 110 is different from the voltage polarity of the secondary winding 112 through a position of a dot of the first secondary winding 110 and a position of a dot of the second secondary winding 112. That is to say, the first output voltage VO1 can be generated by a DC (direct current) voltage VIN, the inductor Lr, the primary winding 108, and the first secondary winding 110, wherein the DC voltage VIN is generated by an input voltage VAC (alternating current voltage) being rectified by the bridge rectifier 120. Because the primary side current IPRI1 charges the capacitor Cr, if the turning-on time TON1 of the upper bridge switch 102 is longer, it means that when the lower bridge switch 104 is turned on (the upper bridge switch 102 is turned off), the capacitor Cr can provide more energy to the second secondary winding 112. In addition, because the control circuit 114 controls the turning-on time TON1 of the upper bridge switch 102 according to the second output voltage VO2, when the second output voltage VO2 is lower, the control circuit 114 can increase the turning-on time TON1 of the upper bridge switch 102 (that is, the control circuit 114 can make the turning-on time TON1 of the upper bridge switch 102 be changed with the second output voltage VO2 inversely), resulting in the capacitor Cr storing more energy. Therefore, when the lower bridge switch 104 is turned on, the capacitor Cr can provide more energy to the second secondary winding 112, so that the second output current IO2 flowing through the second secondary winding 112 is increased.

As shown in FIG. 3, when the lower bridge switch 104 is turned on (the upper bridge switch 102 is turned off), the capacitor Cr start to discharge, resulting in a primary side current IPRI2 flowing through the primary winding 108, the inductor Lr, and the lower bridge switch 104. At this time, because the voltage polarity of the first secondary winding 110 is different from the voltage polarity of the second secondary winding 112, only the second output current IO2 flows through the second secondary winding 112. That is to say, the second output voltage VO2 can be generated by charges stored in the capacitor Cr, the inductor Lr, the primary winding 108, and the second secondary winding 112. As shown in FIG. 3, if the turning-on time TON2 of the lower bridge switch 104 is longer, the capacitor Cr can discharge to a lower voltage level. It means that when the upper bridge switch 102 is turned on (the lower bridge switch 104 is turned off), the inductor-capacitor resonant tank 106 can provide more energy to the first secondary winding 110. In addition, because the control circuit 114 controls the turning-on time TON2 of the lower bridge switch 104 according to the first output voltage VO1, when the first output voltage VO1 is lower, the control circuit 114 can increase the turning-on time TON2 of the lower bridge switch 104 (that is, the control circuit 114 can make the turning-on time TON2 of the lower bridge switch 104 be changed with the first output voltage VO1 inversely), resulting in the capacitor Cr discharging to the lower voltage level. Therefore, when the lower bridge switch 104 is turned on, the inductor-capacitor resonant tank 106 can provide more energy to the first secondary winding 110, resulting in the first output current IO1 flowing through the first secondary winding 110 being increased.

Figure 4:
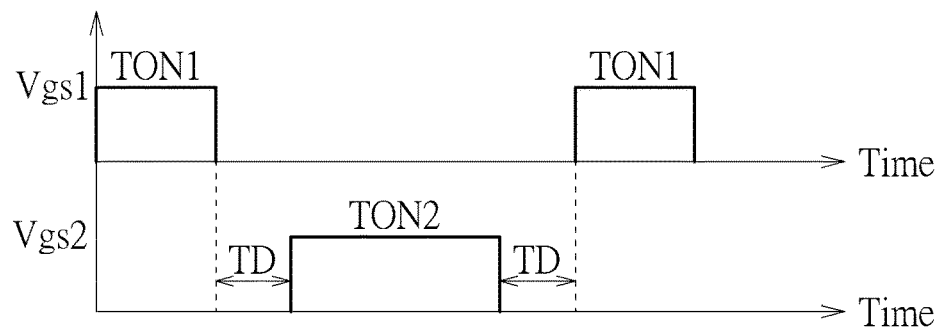
FIG. 4 is a diagram illustrating a dead time existing between a turning-on time of the upper bridge switch and a turning-on time of the lower bridge switch.

Therefore, because the control circuit 114 controls the turning-on time TON2 of the lower bridge switch 104 according to the first output voltage VO1 and controls the turning-on time TON1 of the upper bridge switch 102 according to the second output voltage VO2, the turning-on time TON1 of the upper bridge switch 102 can be not equal to the turning-on time TON2 of the lower bridge switch 104. In addition, the upper bridge switch 102 and the lower bridge switch 104 are not simultaneously turned on, and a dead time TD exists between the turning-on time TON1 of the upper bridge switch 102 and the turning-on time TON2 of the lower bridge switch 104, wherein as shown in FIG. 4, the dead time TD is adjustable and used for regulating the second output voltage VO2 and the first output voltage VO1, and Vgs1 represents a voltage of a gate of the upper bridge switch 102 and Vgs2 represents a voltage of a gate of the lower bridge switch 104. In addition, a ratio of the second output voltage VO2 to the first output voltage VO1 can be any real number greater than one through a feedback control method of the control circuit 114 controlling the turning-on time TON2 of the lower bridge switch 104 according to the first output voltage VO1 and controlling the turning-on time TON1 of the upper bridge switch 102 according to the second output voltage VO2.

Figure 5:
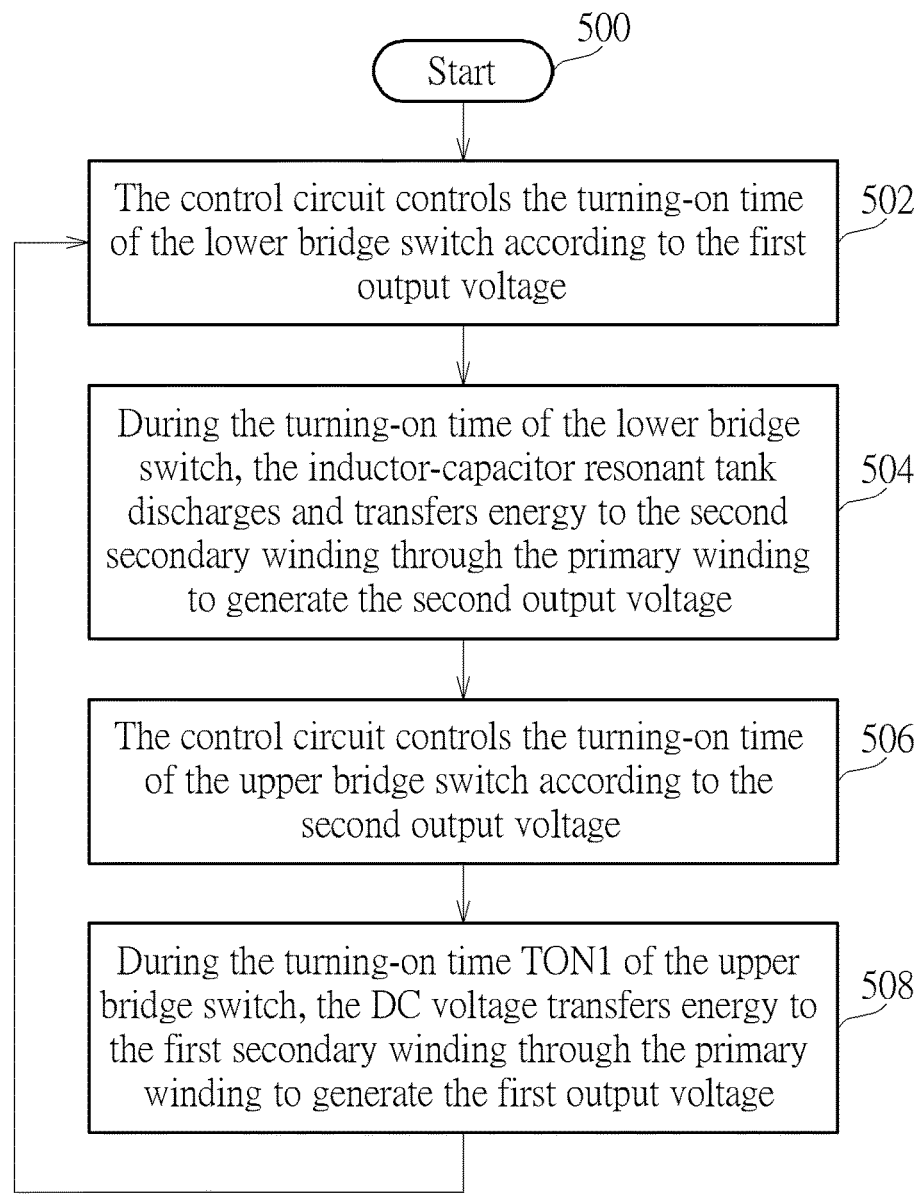
FIG. 5 is a flowchart illustrating an operational method of an asymmetric power converter according to a second embodiment of the present invention.

In addition, please refer to FIGS. 1-3, 5. FIG. 5 is a flowchart illustrating an operational method of an asymmetric power converter according to a second embodiment of the present invention. The operational method of FIG. 5 is illustrated using the asymmetric power converter 100 in FIG. 1. Detailed steps are as follows:

Step 500: Start.

Step 502: The control circuit 114 controls the turning-on time TON2 of the lower bridge switch 104 according to the first output voltage VO1.

Step 504: During the turning-on time TON2 of the lower bridge switch 104, the inductor-capacitor resonant tank 106 discharges and transfers energy to the second secondary winding 112 through the primary winding 108 to generate the second output voltage VO2.

Step 506: The control circuit 114 controls the turning-on time TON1 of the upper bridge switch 102 according to the second output voltage VO2.

Step 508: During the turning-on time TON1 of the upper bridge switch 102, the DC voltage VIN transfers energy to the first secondary winding through the primary winding 108 to generate the first output voltage VO1, go to Step 502.

In Step 502 and Step 504, as shown in FIG. 3, when the lower bridge switch 104 is turned on (the upper bridge switch 102 is turned off), the capacitor Cr start to discharge, resulting in the primary side current IPRI2 flowing through the primary winding 108, the inductor Lr, and the lower bridge switch 104. At this time, because the voltage polarity of the first secondary winding 110 is different from the voltage polarity of the second secondary winding 112, only the second output current IO2 flows through the second secondary winding 112. That is to say, the second output voltage VO2 can be generated by charges stored in the capacitor Cr, the inductor Lr, the primary winding 108, and the second secondary winding 112. As shown in FIG. 3, if the turning-on time TON2 of the lower bridge switch 104 is longer, the capacitor Cr can discharge to the lower voltage level. It means that when the upper bridge switch 102 is turned on (the lower bridge switch 104 is turned off), the inductor-capacitor resonant tank 106 can provide more energy to the first secondary winding 110. In addition, because the control circuit 114 controls the turning-on time TON2 of the lower bridge switch 104 according to the first output voltage VO1, when the first output voltage VO1 is lower, the control circuit 114 can increase the turning-on time TON2 of the lower bridge switch 104 (that is, the control circuit 114 can make the turning-on time TON2 of the lower bridge switch 104 be changed with the first output voltage VO1 inversely), resulting in the capacitor Cr discharging to the lower voltage level. Therefore, when the lower bridge switch 104 is turned on, the inductor-capacitor resonant tank 106 can provide more energy to the first secondary winding 110, resulting in the first output current IO1 flowing through the first secondary winding 110 being increased.

In Step 506 and Step 508, as shown in FIG. 2, when the upper bridge switch 102 is turned on (the lower bridge switch 104 is turned off), the primary side current IPRI1 flows through the upper bridge switch 102, the inductor Lr of the inductor-capacitor resonant tank 106, and the primary winding 108 to charge the capacitor Cr of the inductor-capacitor resonant tank 106. At this time, because the voltage polarity of the first secondary winding 110 is different from the voltage polarity of the secondary winding 112, only the first output current IO1 flows through the first secondary winding 110. That is to say, the first output voltage VO1 can be generated by the DC voltage VIN, the inductor Lr, the primary winding 108, and the first secondary winding 110. Because the primary side current IPRI1 charges the capacitor Cr, if the turning-on time TON1 of the upper bridge switch 102 is longer, it means that when the lower bridge switch 104 is turned on (the upper bridge switch 102 is turned off), the capacitor Cr can provide more energy to the second secondary winding 112. In addition, because the control circuit 114 controls the turning-on time TON1 of the upper bridge switch 102 according to the second output voltage VO2, when the second output voltage VO2 is lower, the control circuit 114 can increase the turning-on time TON1 of the upper bridge switch 102 (that is, the control circuit 114 can make the turning-on time TON1 of the upper bridge switch 102 be changed with the second output voltage VO2 inversely), resulting in the capacitor Cr storing more energy. Therefore, when the lower bridge switch 104 is turned on, the capacitor Cr can provide more energy to the second secondary winding 112, so that a second output current IO2 flowing through the second secondary winding 112 is increased.

To sum up, the asymmetric power converter and the operational method thereof utilize a dual-feedback control of the control circuit controlling the turning-on time of the lower bridge switch according to the first output voltage and controlling the turning-on time of the upper bridge switch according to the second output voltage to make the asymmetric power converter only need three windings (the primary winding, the first secondary winding and the second secondary winding), the ratio of the second output voltage to the first output voltage be any real number greater than one, and the turning-on time of the upper bridge switch be not equal to the turning-on time of the lower bridge switch. Therefore, compared to the prior art, because the ratio of the second output voltage to the first output voltage can be any real number greater than one, the asymmetric power converter is very suitable for a backlight drive application such as a television requiring a larger output voltage range, and because the asymmetric power converter only needs the three windings, cost of the asymmetric power converter is lower.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An asymmetric power converter, comprising:
    an upper bridge switch;
    a lower bridge switch;
    a primary winding, wherein the upper bridge switch and the lower bridge switch are coupled to the primary winding, and the upper bridge switch, the lower bridge switch, and the primary winding are installed in a primary side of the asymmetric power converter;
    a first secondary winding and a second secondary winding, for outputting a first output voltage and a second output voltage of a secondary side of the asymmetric power converter respectively, wherein the first secondary winding and the second secondary winding are installed in the secondary side of the asymmetric power converter, and voltage polarity of the first secondary winding is different from voltage polarity of the second secondary winding; and
    a control circuit having two inputs for receiving the first output voltage and the second output voltage and has two outputs coupled to a gate of the upper bridge switch and a gate of the lower bridge switch, wherein the control circuit controls a turning-on time of the lower bridge switch and a turning-on time of the upper bridge switch according to the first output voltage and the second output voltage, respectively.

2. The asymmetric power converter of claim 1, wherein the first output voltage is lower than the second output voltage, and a ratio of the second output voltage to the first output voltage is a real number greater than one.

3. The asymmetric power converter of claim 1, wherein a turning-on time of the upper bridge switch is not equal to a turning-on time of the lower bridge switch.

4. The asymmetric power converter of claim 1, wherein the upper bridge switch and the lower bridge switch are not simultaneously turned on.

5. The asymmetric power converter of claim 1, wherein a dead time exists between a turning-on time of the upper bridge switch and a turning-on time of the lower bridge switch.

6. The asymmetric power converter of claim 1, wherein the control circuit is isolated from the secondary side of the asymmetric power converter by a first isolation component and a second isolation component.

7. The asymmetric power converter of claim 6, wherein the first isolation component and the second isolation component are photo couplers.

8. The asymmetric power converter of claim 1, wherein the asymmetric power converter is an inductor-inductor-capacitor power converter.

9. The asymmetric power converter of claim 1, wherein when the control circuit controls the lower bridge switch according to the first output voltage, a turning-on time of the lower bridge switch is changed with the first output voltage inversely.

10. The asymmetric power converter of claim 1, wherein when the control circuit controls the upper bridge switch according to the second output voltage, a turning-on time of the upper bridge switch is changed with the second output voltage inversely.

11. The asymmetric power converter of claim 1, further comprising:
    an inductor-capacitor resonant tank (LC resonant tank) coupled between the upper bridge switch and the primary winding, and coupled between the lower bridge switch and the primary winding.

12. The asymmetric power converter of claim 1, wherein the second output voltage is greater than the first output voltage.

13. An operational method of an asymmetric power converter, wherein the asymmetric power converter comprises an upper bridge switch, a lower bridge switch, a primary winding, a first secondary winding, a second secondary winding, and a control circuit, and a gate of the upper bridge switch and a gate of the lower bridge switch are connected to the control circuit, the operational method comprising:
    through the gate of the lower bridge switch, controlling a turning-on time of the lower bridge switch by the control circuit according to a first output voltage received by the control circuit;
    during the turning-on time of the lower bridge switch, the inductor-capacitor resonant tank discharging and transferring energy to the second secondary winding through the primary winding to generate a second output voltage;
    through the gate of the upper bridge, controlling a turning-on time of the upper bridge switch by the control circuit according to the second output voltage received by the control circuit; and
    during the turning-on time of the upper bridge switch, a direct current (DC) voltage transferring energy to the first secondary winding through the primary winding to generate the first output voltage;
    wherein voltage polarity of the first secondary winding is different from voltage polarity of the second secondary winding.

14. The operational method of claim 13, wherein the first output voltage is lower than the second output voltage, and a ratio of the second output voltage to the first output voltage is a real number greater than one.

15. The operational method of claim 13, wherein the turning-on time of the upper bridge switch is not equal to the turning-on time of the lower bridge switch.

16. The operational method of claim 13, wherein the upper bridge switch and the lower bridge switch are not simultaneously turned on.

17. The operational method of claim 13, wherein a dead time exists between the turning-on time of the upper bridge switch and the turning-on time of the lower bridge switch.

18. The operational method of claim 13, wherein when the control circuit controls the lower bridge switch according to the first output voltage, the turning-on time of the lower bridge switch is changed with the first output voltage inversely.

19. The operational method of claim 13, wherein when the control circuit controls the upper bridge switch according to the second output voltage, the turning-on time of the upper bridge switch is changed with the second output voltage inversely.

20. The operational method of claim 13, wherein the second output voltage is greater than the first output voltage.

* * * * *